(12) United States Patent
Rousseaux et al.

(10) Patent No.: US 7,807,119 B2
(45) Date of Patent: Oct. 5, 2010

(54) BAYER PROCESS FOR PRODUCTION OF ALUMINA TRIHYDRATE, THE SAID IMPROVEMENT RELATING TO SEPARATION OF ALUMINATE LIQUOR AND INSOLUBLE RESIDUES

(75) Inventors: Jean-Marc Rousseaux, Aix-en-Provence (FR); Gerard Pignol, Gardanne (FR); Yves Magnan, Simiana Collongue (FR)

(73) Assignee: Aluminium Pechiney, Voreppe (FR)

( * ) Notice: Subject to any disclaimer, the term of this patent is extended or adjusted under 35 U.S.C. 154(b) by 686 days.

(21) Appl. No.: 11/573,749

(22) PCT Filed: Sep. 19, 2005

(86) PCT No.: PCT/FR2005/002309

§ 371 (c)(1),
(2), (4) Date: Feb. 15, 2007

(87) PCT Pub. No.: WO2006/032770

PCT Pub. Date: Mar. 30, 2006

(65) Prior Publication Data

US 2007/0243118 A1    Oct. 18, 2007

(30) Foreign Application Priority Data

Sep. 21, 2004 (FR) .................................. 04 09946

(51) Int. Cl.
*C01F 7/00* (2006.01)

(52) U.S. Cl. .................. 423/121; 423/122; 423/123; 423/124; 423/625; 423/629; 137/563; 366/136; 239/127; 222/318; 209/160; 209/500; 23/297; 23/299; 23/305 A

(58) Field of Classification Search ......... 423/121–124, 423/625, 629; 137/563; 366/136; 239/127; 222/318; 209/160, 500; 23/297, 299, 305 A
See application file for complete search history.

(56) References Cited

U.S. PATENT DOCUMENTS

| 4,328,094 | A | | 5/1982 | Peck et al. | |
|---|---|---|---|---|---|
| 5,869,020 | A | * | 2/1999 | Rijkeboer et al. | ............ 423/629 |
| 6,340,033 | B2 | * | 1/2002 | Paradis et al. | ................ 137/563 |

FOREIGN PATENT DOCUMENTS

| DE | 19903011 | 8/2000 |
|---|---|---|
| FR | 2718982 | 10/1995 |

* cited by examiner

*Primary Examiner*—Steven Bos
(74) *Attorney, Agent, or Firm*—Dennison, Schultz & MacDonald

(57) ABSTRACT

A process for the production of alumina trihydrate by alkaline digestion of bauxite using the Bayer process in which aluminate liquor and insoluble residues are separated using a solid/liquid separation device (E; W2; DC) characterised in that the said slurry (21a; 41; 230') is at least partially passed through a hydrocyclone (H1; H21; H22; H3) to improve and accelerate the separation of the sodium aluminate liquor from the insoluble residues in the slurry (21a; 41; 230') containing the said liquor and the said residues and that supplies or is derived from the said liquid-solid separation device. In a first embodiment, at least one hydrocyclone is used at the upstream side of the settler-thickener, as clarifier of the pregnant liquor. In a second embodiment, at least one hydrocyclone is used as a thickener of insoluble residue mud. In a third embodiment, a hydrocyclone is used in combination with the causticisation settler.

12 Claims, 7 Drawing Sheets

BAYER PROCESS FOR PRODUCTION OF ALUMINA TRIHYDRATE, THE SAID IMPROVEMENT RELATING TO SEPARATION OF ALUMINATE LIQUOR AND INSOLUBLE RESIDUES

FIELD OF THE INVENTION

The invention relates to an improvement to the process for the production of alumina trihydrate by alkaline digestion of bauxite using the Bayer process. It more particularly relates to the different techniques for liquid/solid separation used to extract insoluble residues derived from digestion, that are in the form of small particles (D50 significantly less than 100 µm, and typically less than 20 µm).

DESCRIPTION OF RELATED ART

The Bayer process has been widely described in the specialised literature, and is the essential technique for production of alumina to be transformed into aluminium by fused bath electrolysis or to be used in the hydrate, transition alumina, calcined alumina, sintered or molten alumina state, in many applications related to the domain of non-metallurgical aluminas. According to this process, the bauxite ore is ground and then digested hot using an aqueous solution of sodium hydroxide with an appropriate concentration, thus causing solubilisation of alumina to obtain a slurry composed of undigested residue particles immersed in a solution of sodium aluminate called "aluminate liquor". This slurry is then diluted and treated so as to separate undigested residues from aluminate liquor, usually by settling. The liquor derived from this separation is in a supersaturation state that causes crystallisation of alumina trihydrate, a phenomenon known as "crystallisation". After precipitation, the sodium aluminate liquor, depleted in alumina hydrate due to the precipitation, is recycled after concentration to digestion of the ore.

After digestion and dilution, the slurry comprises all insoluble residues in bauxite. The major part is in the form of a very fine mud (red mud) originating from disintegration during digestion of the alumino-ferric constituent of bauxite and its particle size is more or less independent of prior grinding conditions of the bauxite; the size of the elementary grains is between 0.1 and 20 µm. Sometimes, with some grades of bauxite and more particularly if grinding was not done thoroughly, there is also a certain quantity of coarser residues (diameter typically more than 106 µm) called "sands", richer in $Fe_2O_3$ and less rich in $SiO_2$ than red mud. For example, these sands originate from depletion of ferruginous pisolites that are very abundant in some bauxite grades, by soda. When their proportion exceeds a few %, these sands are separated without any particular difficulty using equipment conventional in the mining industry such as drag classifiers, screw separators or (as indicated in DE 199 03 011) hydrocyclones associated with a vibrating dewatering screen. This invention does not relate to separation of these sands.

However, red mud is more difficult to separate and to wash, due to the much finer particle size of the particles from which they are composed. At the present time, the main technique used in the alumina industry is sedimentation, carried out in continuously operating settlers-thickeners. Sedimentation is associated with two phenomena; settling itself, or clarification, designed to separate liquors with no mud and thickening of the deposited mud, which affects the efficiency of subsequent washing.

Several factors have an influence on the settlement rate; simple physical factors that govern the drop rate of particles within a slurry (particle diameter, density, liquid viscosity, etc.) and flocculation phenomena (aggregation of particles) complex and extremely variable depending on the source of the digested bauxite. The addition of flocculating agents very significantly increases settlement rates. Thus, for example, EP 0 618 882 (ALCAN) describes the addition of a flocculating agent based on acrylamide and/or sodium acrylate, WO97/41065 (CYTEC) describes the use of hydroxamates with a high molecular weight (more than 10 000, preferably 1 000 000), WO99/30794 (NALCO) describes the use of a polymer with high molecular weight based on methylacrylate and acrylic acid, WO99/61129 (NALCO) describes a flocculating agent consisting of a mix of dextran+starch. This practice is now widespread, despite the extra cost and sometimes undesirable side effects of some of these additives.

The thickenability of mud, in other words the possibility of maximizing the solid content of slurries by settling, is a specific property of the mud, and consequently of the bauxite from which it is derived. Under normal conditions, this thickenability is usually the overriding element controlling the operating rate of a settler, for which one running feature is defined by the ratio K between the volume of clear liquor output from the settler and the volume of liquor impregnated in the extracted mud.

Finally, with this sedimentation technique, thorough washing of mud is done by successive dilutions and settling, with reverse current circulation of mud and wash water. The washing efficiency depends on the quantity of water used, the thickening constant K of the settlers-washers passed through, and the number of successive washings done. The wash water gradually becomes richer in soda and sodium aluminate entrained by the mud. At the end of its path through the washing line, and after it has been used for washing mud originating from settling of the slurry after digestion, the water is in the form of a diluted sodium aluminate liquor (first settler-washer clear liquor) that is usually directed to the digestion output to dilute the slurry; thus, some of the soda entrained in the red mud is recovered. However, dilution must not be too great since, after precipitation, the liquor must be concentrated by evaporation so that it can be recycled as a green liquor. Therefore, it is advantageous to minimize the quantity of wash water returned for dilution. The most economic solution must be the result of a compromise between the quantity of water used, the adopted number of washings, and the thickening achieved in each settling in the washing line. To reduce the consumed water quantity (and therefore the energy necessary to evaporate it), an efficient means of thickening of the mud has to be found, and this is always difficult to achieve due to the fine particle size of the red mud.

Moreover, separation techniques alternative to sedimentation have been developed. An attempt has been made to replace the settler-thickener by a system capable of separating the solid and liquid more quickly, for example a centrifugal settler. Separation can also be done by filtration using a particular preparation of the slurry, as is divulged in application FR 2846 319 by the inventors, in which the ground bauxite is mixed with the aluminate liquor which is already at a temperature close to the boiling point, which has the surprising effect of very much improving the filterability of the resulting slurry. Thus, with such a process, the settler-thickener can be replaced by a series of conventional filters operating at a vacuum or under pressure.

The inventors have attempted to accelerate and improve liquid/solid separation of the slurry that contains the aluminate liquor and insoluble residues, independently of the bauxite used and without increasing the consumption of flocculating agents.

Accelerating separation consists of increasing the extraction rate of the solid residues resulting from digestion of the said bauxite, particularly residues which are in the form of particles that are very difficult to separate, in other words particles for which the particle size is less than 100 µm. Increasing the extraction rate of these residues provides a means of reducing the residence time of the pregnant aluminate liquor between dilution and precipitation. Reducing the residence time of the pregnant liquor between dilution and precipitation provides a means of avoiding an economically disastrous phenomenon, namely reversion, in other words untimely precipitation of alumina trihydrate particles that occurs before the insoluble residues have been separated; alumina trihydrate is precipitated early, intimately mixed with the red mud, and is removed with the mud and cannot be reused. The reduction in the residence time also increases supersaturation conditions of the aluminate liquor, for an equal risk of reversion, and therefore obtains better global productivity of the cycle resulting in more efficient extraction of alumina.

Improving separation is equivalent to obtaining a clearer liquid/or thicker mud. Increasing the thickness or compaction of mud means that they can be washed more efficiently with less water.

Although the description of the invention given below is based on the sedimentation separation technique using a settler-thickener, it must also be possible to apply the improvement to the alternative separation techniques mentioned above.

SUMMARY OF THE INVENTION

A first purpose of the invention is a process for production of alumina trihydrate by alkaline digestion of bauxite using the Bayer process which comprises grinding and then digestion of the ground bauxite by bringing it into contact with a sodium aluminate liquor, digestion consisting of forming a slurry that is treated to separate insoluble residues from the sodium aluminate liquor, the aluminate liquor thus obtained then being crystallised and recycled as a green liquor after being separated from the alumina trihydrate precipitated during crystallisation, the said process being characterised in that the slurry containing the said insoluble residues is at least partially passed through a hydrocyclone in order to improve and accelerate the separation of the aluminate liquor from the insoluble residues with particle size less than 100 µm (insoluble residues with particle size greater than 100 µm, if there are any, were separated earlier using conventional equipment in the mining industry).

Conventionally, the treatment to separate insoluble residues from the aluminate liquor is based on a sedimentation technique; after digestion, the slurry passes through a settler-thickener and the underflow is extracted and then washed by back-washing with water that gradually becomes richer in soda, which is advantageously used for dilution of the slurry after digestion. The process according to the invention is like an improvement to this sedimentation technique. However, particularly with the first embodiment of the invention, the settler-thickener used conventionally could advantageously be replaced by another system capable of more efficiently treating smaller flows of thicker slurries, for example a centrifuge settler or a filter.

Regardless of the separation device used in the Bayer circuit, this invention does not propose to replace this system by one or several hydrocyclones, but rather to use this existing system in association with at least one hydrocyclone, placed either on the upstream side (supply) or on the downstream side (underflow and/or overflow) of the said system.

The method according to the invention does not concern demanding of insoluble residues, with sands with a particle size of more than approximately 100 µm, typically more than or equal to 106 µm (in practice, sands are retained by a 106 µm or 315 µm screen, depending on the plant), demanding being done by conventional means that cannot be suitable for efficient separation of particles with dimension (D50) smaller than 10 µm. In other words, the method according to the invention can accelerate or improve separation within the slurry between the sodium aluminate liquor and insoluble residues strictly smaller than 106 µm. Apart from demanding, the use of hydrocyclones in a Bayer circuit was not used in the past except to isolate alumina hydrate particles larger than 50 µm (classification). Initially, it did not seem possible to use hydrocyclones to separate fine particles of red mud (D50< 10 µm), but after studying the different parameters that govern the operation of a hydrocyclone, the inventors were able to define operating conditions suitable for fast separation of these residues that enable the use of the said hydrocyclones at different steps in the process, or even to operate a fairly high number of these hydrocyclones (typically a few dozens or a few hundreds) in parallel.

According to the invention, the slurry can be passed through at least one hydrocyclone on the upstream side or downstream side of the existing separation device (settler-thickener), centrifuge settler or filter). Thus:

in a first embodiment, at least one hydrocyclone is used on the input side of the existing solid/liquid separation device placed on the supply circuit of the said device and used as a clarifier for the pregnant liquor, the underflow from the hydrocyclone(s) supplying the said device;

in a second embodiment, at least one hydrocyclone on the upstream or downstream side of the existing solid/liquid separation device is used, acting as a thickener of the insoluble residue mud;

in a third embodiment, a hydrocyclone is used in combination with the liquid/solid separation device used for causticisation (usually a settler-thickener) to improve the liquid/solid separation of causticisation mud.

According to the first embodiment of the invention, at least one hydrocyclone is used as clarifier of the pregnant aluminate liquor. At least one slurry aliquot is drawn off after digestion and dilution, and is then passed through at least one particular hydrocyclone, characterised in that the diameter of the underflow nozzle is more than 90% of the diameter of the overflow nozzle, preferably between 90% and 110% of the said diameter of the overflow nozzle.

According to this first embodiment, a flocculent is advantageously added into the slurry before it is added in the hydrocyclone and the underflow from the hydrocyclone is thickened in the existing separation device without the need to add a large quantity of flocculent. When a flocculent has been added into the diluted slurry on the upstream side of the hydrocyclone, it is found that the hydrocyclone overflow is clarified such that its solid content is typically divided by a factor of more than 10, and it is sufficiently low so that it can be transferred either directly or after mixing with the overflow from the existing separation device to the safety filtration and the precipitation line. It was also observed that the hydrocyclone overflow contained very large flakes and was consequently very easy to filter.

Thus according to one preferred implementation of this first embodiment, flocculent is added into the diluted slurry aliquot that is directed to the hydrocyclone(s). The pregnant liquor output from the overflow from the hydrocyclone(s) is sent to the crystallisation line without passing through the settler-thickener and mud originating from the underflow of the hydrocyclone(s) is sent to the settler-thickener where they are clarified and thickened without any or with very little additional flocculent.

The advantage of the hydrocyclone+separation device combination that exists in the first embodiment, in other words by at least partially passing the slurry at the output through a hydrocyclone, lies in the fact that separation is done very quickly (residence time of few seconds); a large proportion of the aluminate liquor flow does not need to pass through the existing separation device, which consequently has a significantly lower flow of slurry to be treated (of the order of 30% if the entire slurry passes through the hydrocyclones). Thus, the slurry flow can be increased without changing the installations. In fact, a large fraction of the solid residues is treated by the hydrocyclone, so that the quantity of flocculent necessary for the existing separation device can be significantly reduced. Since the liquid flow sent to the existing separation device is also reduced, with these means it is possible to debottleneck and/or increase the productivity of the said existing separation device.

Although the average residence time of the liquor between its dilution and its entry into the precipitation line is measured in hours with the conventional sedimentation process, this residence time drops to a few seconds with the first embodiment of this invention. The result is that there is practically no longer any risk of retrogradation, in other words untimely precipitation of particles of alumina trihydrate before separation of the insoluble residues. The reduction in the residence time also provides a means of increasing supersaturation conditions of the aluminate liquor, for equal risk of retrogradation, and therefore globally obtaining better global productivity of the cycle. But it would also be possible to reduce the residence time between dilution and crystallisation of the portion of liquor not passing through the overflow from the hydrocyclone and in this case it would be desirable to replace the settler-thickener used conventionally, by another device capable of more quickly separating thicker slurries, for example a centrifuge-settler or a filter.

Furthermore, introduction of a hydrocyclone on the upstream side of the settler-thickener, makes it possible to envisage a lesser dilution, which would reduce the global energy consumption of the Bayer process.

According to the second embodiment of the invention, at least one hydrocyclone is used as a thickener of insoluble residue mud, either to treat at least part of the slurry output from digestion on the upstream side of the adjusting separation device, or to thicken mud output from the existing separation device, particularly on the upstream side or at the head of the washing line.

According to a first version of this second embodiment, at least one hydrocyclone is used to thicken at least part of the slurry derived from digestion to improve the existing separation device. At least one slurry aliquot is sampled after digestion, preferably after dilution (for example reduction of the caustic using clear liquor from the first washer) and/or after adding flocculent. This aliquot is passed through at least one hydrocyclone. Geometric parameters of the hydrocyclone are defined to effectively thicken the underflow that is directed directly towards mud from the underflow of the existing separation device. The overflow is directed to the existing separation device, thus diluting the other aliquot of the slurry that is directly poured into the existing device (in other words reducing the solid content). Thus, the operation of the said existing device is improved by debottlenecking it and improving its efficiency, liquid/solid separation being improved by dilution.

According to a second version of this second embodiment, at least one hydrocyclone is used to thicken at least part of the red mud output from the existing separation device. The red mud is extracted from the Bayer circuit when they typically reach a solid content of more than 400 g/l. In the sedimentation separation technique, the slurry passes into a settler-thickener after digestion, the usage conditions of which are defined such that the underflow from the settler-thickener reaches or exceeds this solid content. This insoluble residues mud is extracted and is then washed with back wash in a settlers-washers line using water that gradually becomes richer in soda, the clear liquor from the first washer being input into the Bayer circuit for dilution after digestion. The underflow from each washer-settler gradually becomes depleted in soda and the underflow from the last washer, commonly called "red mud" is for example evacuated by dry-stacking.

According to the second version of this second embodiment of the invention, the washing line is modified as follows: at least one hydrocyclone is introduced in the circuit carrying the wash water in backwash from one settler-washer to another settler-washer on the upstream side of the first. If the settlers-washers in the washing line are denoted $W_1$, $W_2, \ldots, W_n$, the increasing order of the indexes corresponding to the direction of circulation of the mud, and if $W_1$ is the washer concerned by the introduction of a hydrocyclone, an aliquot of the wash water originating from the downstream settler-washer $W_{i+1}$ is mixed with mud from the underflow from the upstream settler-washer $W_{i-1}$. The mix thus made is added into at least one hydrocyclone, for which the overflow is input into the settler-washer $W_1$ and in which the thickened mud in the underflow is mixed with the mud in the underflow from the same settler-washer $W_i$, the mix then being sent to the downstream settler-washer $W_{i+1}$. Preferably, the hydrocyclone(s) is (are) introduced close to the first washer so that the mud is thickened at the beginning of the washing line. In the example B.3 given below, at least one hydrocyclone is installed on the wash water circuit input into the second washer (I=2).

Introduction of the hydrocyclone(s) improves the washing efficiency by increasing the concentration of mud. The number of washers in the washing line may be reduced, or the quantity of water used for washing may be reduced.

The first and second embodiments of the invention may advantageously be combined.

According to the third embodiment of the invention, the causticisation settler is combined with at least one hydrocyclone. Causticisation is usually done on the red mud wash water, which returns in back wash in the washing line and becomes gradually enriched with sodium aluminate. Thus enriched, the wash water is a diluted aluminate liquor that is used for dilution of the slurry at the output from digestion: thus, part of the soda entrained with the red mud is recovered. Causticisation of this dilution liquor makes it possible to transform the sodium carbonate contained in the liquor by adding lime, which has the effect of increasing the caustic soda content in the liquor, causing precipitation of calcium carbonate. Calcium carbonate precipitates are also small and their separation from the liquor is usually done using a settler, called a settler-clarifier. Since this separation is slow and difficult due to the small size of the particles, and the wash water is a dilute aluminate liquor at the stage at which it is drawn off for causticisation, the objective in this third embodiment of the invention is also to improve the separation of an aluminate liquor and insoluble residues.

According to this third embodiment, the underflow from the causticisation settler is oriented to the hydrocyclone. If the clear liquor that is causticised is the overflow from the second (or third) settler-washer, the overflow from the hydrocyclone is directed to the first (or second) settler-washer. The overflow from the hydrocyclone is either entirely or partly mixed with the underflow from one of the last settler-washer tanks. If the hydrocyclone underflow is only partly mixed with the underflow from one of the last settler-washer tanks, then the other part is recycled to the causticisation reactor in order to improve the reaction efficiency.

Conventionally, the overflow from the causticisation clarifier is input into the washing line at a point on the upstream side (direction of the mud circuit) of the point at which the clear liquor to be causticised was drawn off. For example, if the liquor to be causticised is the overflow from the second (or third) settler-washer, the overflow from the causticisation settler is directed to the first (or second) settler-washer.

Figure 2:
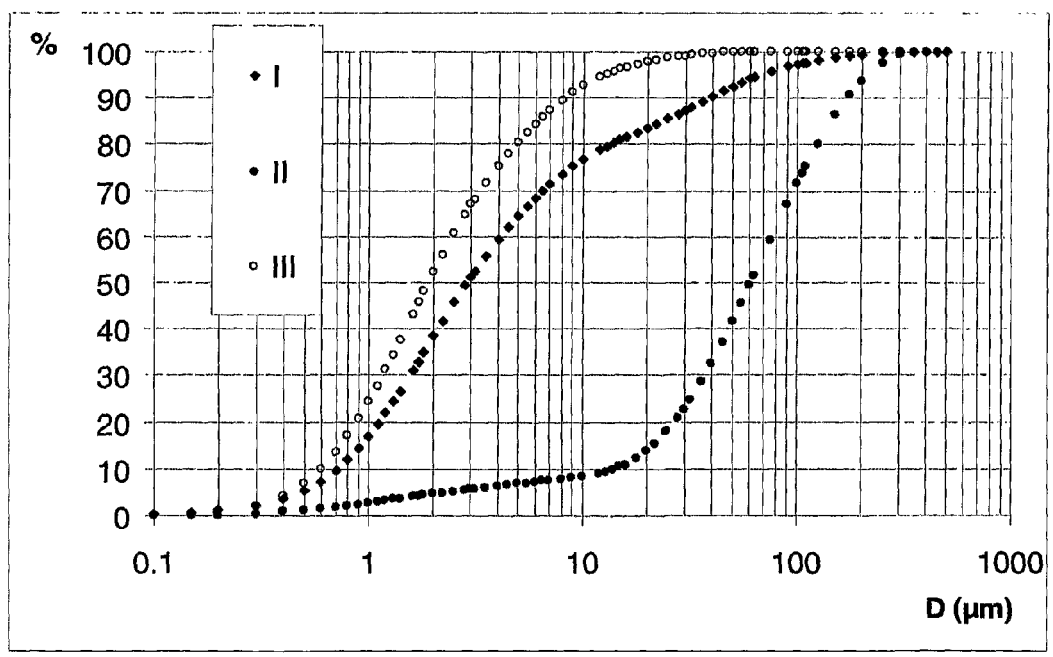

The graph in FIG. 2 illustrates particle size distributions (accumulated % passing as a function of the diameter (D) in microns) of particles present in the supply (I), the underflow (II) and the overflow (III) respectively, of a tested hydrocyclone.

Figure 3:
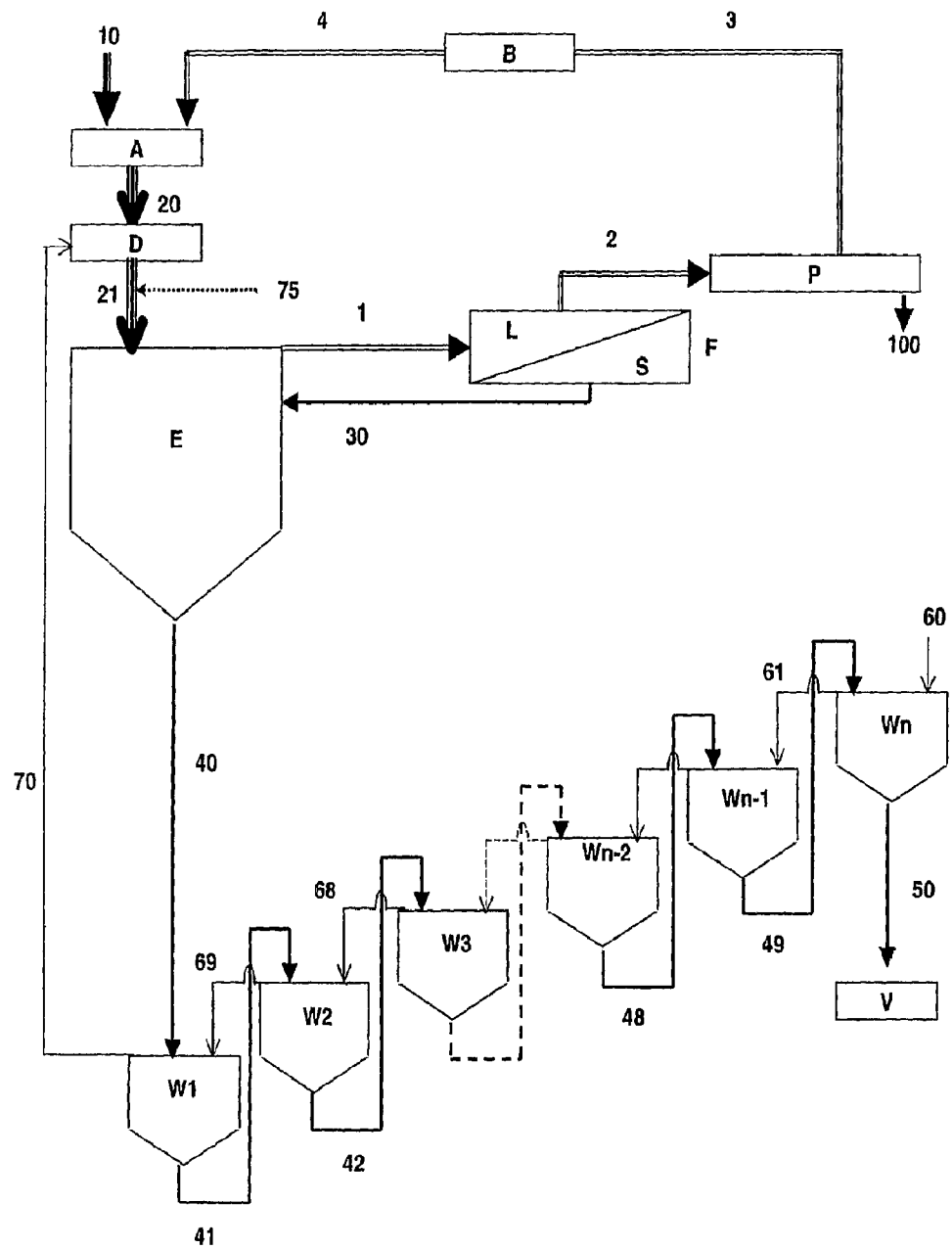

FIG. 3 diagrammatically illustrates a typical Bayer circuit according to prior art.

Figure 4:
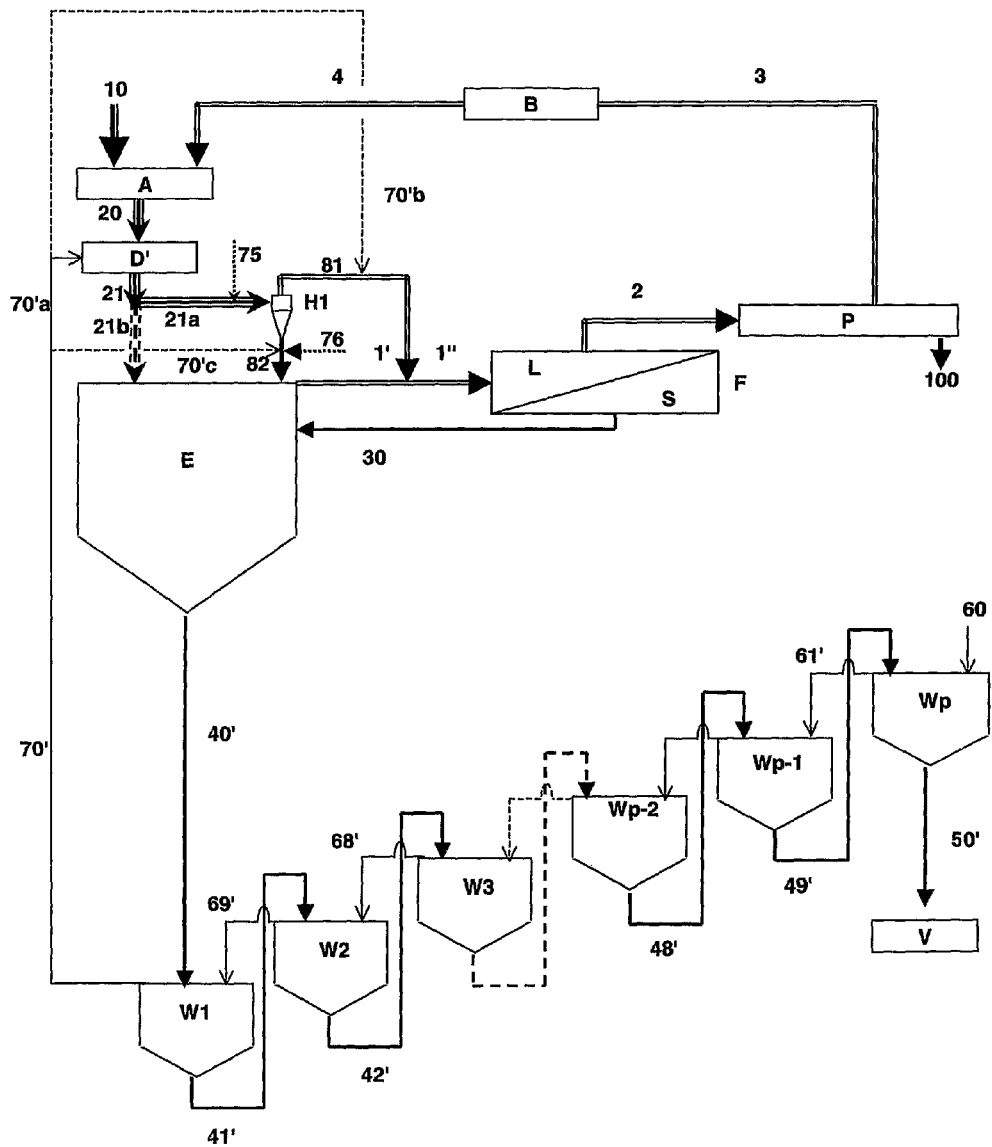

FIG. 4 illustrates a particular implementation of the first embodiment of the invention (clarifier hydrocyclone).

Figure 5A:
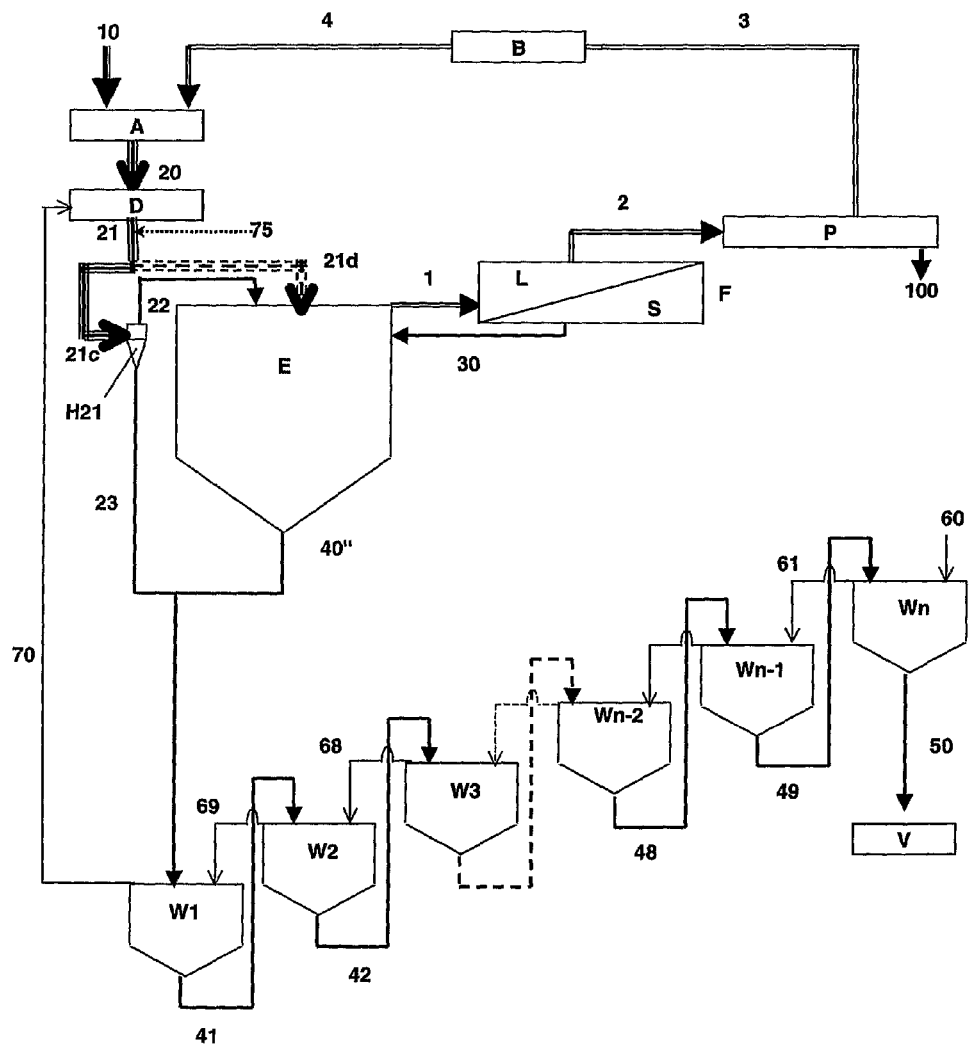
Figure 5B:
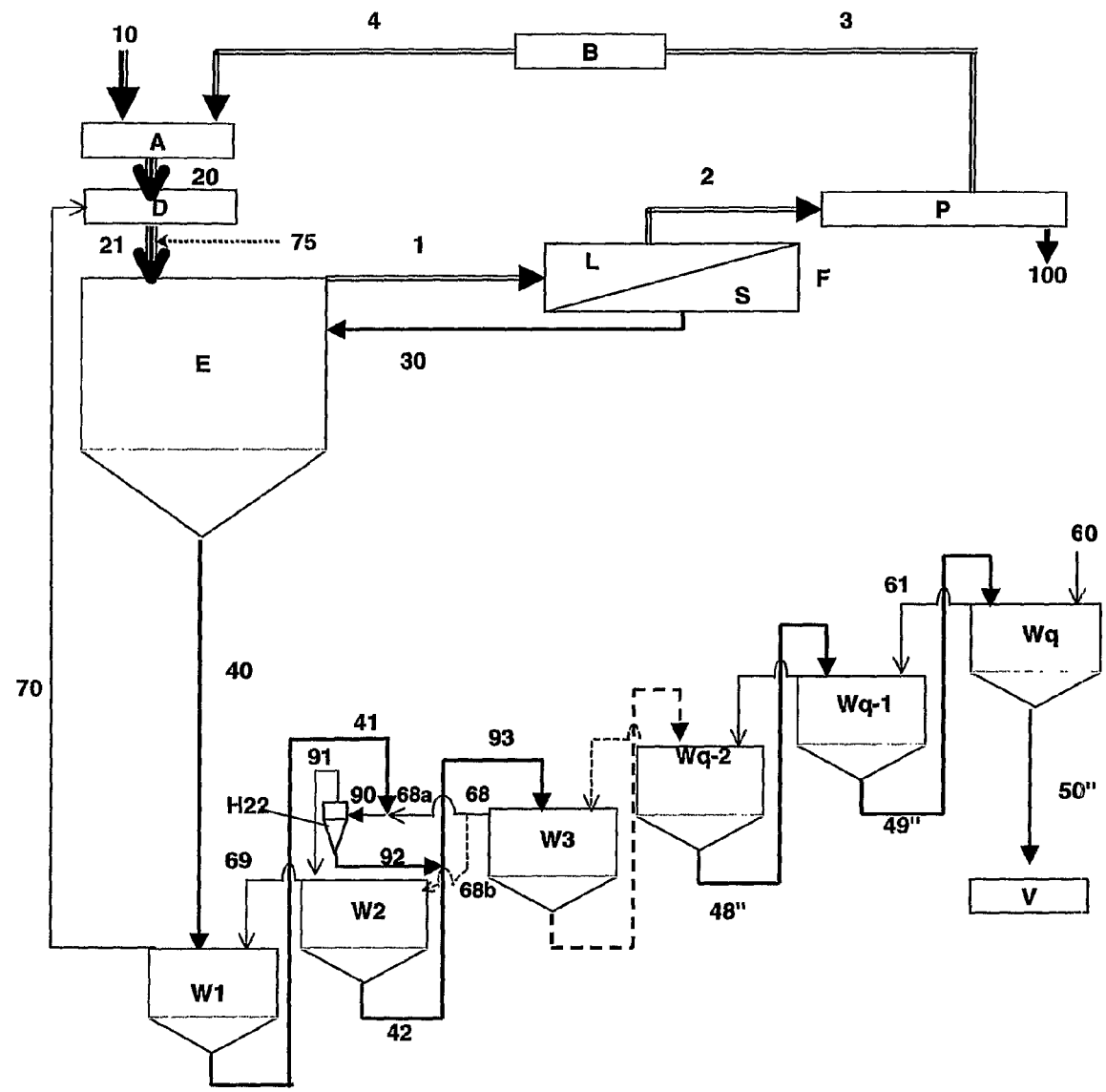

FIGS. 5a and 5b illustrate two particular implementations of the second embodiment of the invention (thickener hydrocyclone).

Figure 1:
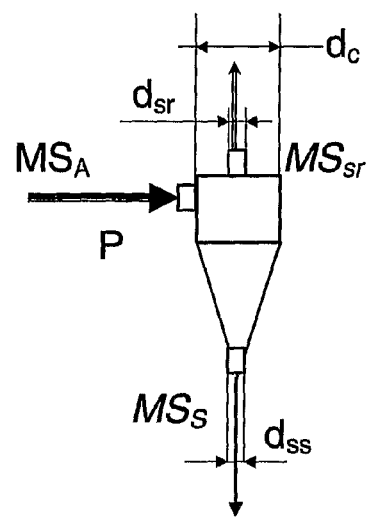
FIG. 1 illustrates the diagram of a hydrocyclone.
Figure 6:
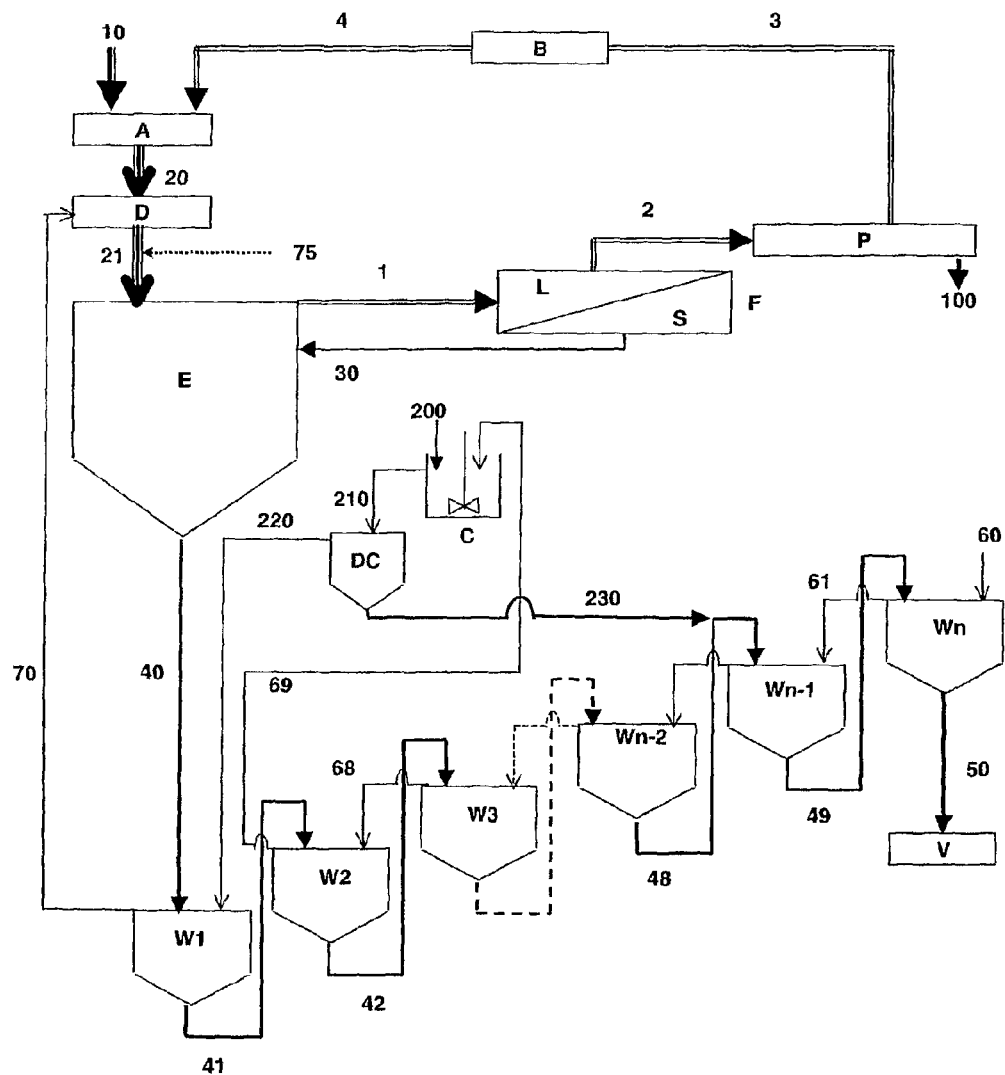

FIG. 6 illustrates a typical example of the water causticisation circuit in the washing line applied on the Bayer process in FIG. 1.

Figure 7:
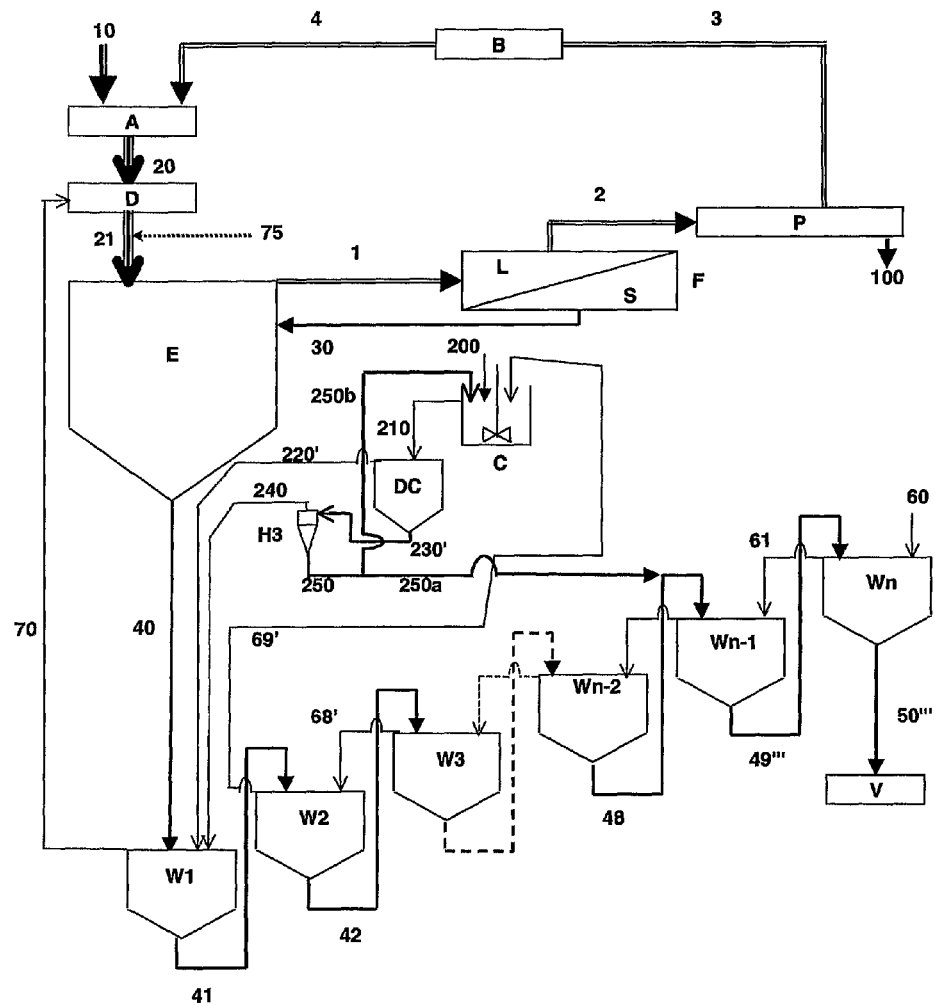

FIG. 7 illustrates the particular implementation of the third embodiment of the invention, applied to improvement of the process illustrated in FIG. 6.

DETAILED DESCRIPTION OF THE INVENTION

A. Tests

A.1. Hydrocyclone Characteristics (FIGS. 1 and 2)

The main operating parameters of a hydrocyclone (also called cyclone in the following) are:
the hydrocyclone diameter ($d_c$), the supply pressure (P),
the diameter of the overflow nozzle ($d_{sr}$),
the diameter of the underflow nozzle ($d_{ss}$).

The cyclone cut diameter is the minimum diameter of particles with 100% chance of being in the underflow. It is related to the geometry (diameter of supply nozzles, underflow nozzles and overflow nozzles, shape and height of the supply spiral, taper and height of the bottom part) and usage conditions of the vessel (pressure, solid content at the feeding point $MS_A$).

Under industrial conditions in the Bayer in which hydrocyclones have been used in prior art (hydrate classification), cut diameters oscillate between 40 and 50 μm for 50 to 100 mm hydrocyclones. Due to the small particle size of particles making up the slurry output from digestion, it would appear impossible to act on the typical geometry and conventional hydrocyclone operating parameters to achieve liquid/solid separation in the said slurry, namely to concentrate particles with a diameter (D50) less than about 10 μm in the underflow of and/or to clarify the slurry in overflow. Despite this, the inventors have tested the use of hydrocyclones to better separate mud, believing that the unfavourable index of a smaller particle size is more the result of a preconception rather than a universally established observation, and that the fine particles of mud actually had particular characteristics that do not exist in the hydrate and that could probably be used beneficially, particularly a certain propensity to form particle clusters with hydrodynamic trajectories intermediate between the individual particles and agglomerates.

Preliminary tests on the slurry after Bayer digestion made it possible to define the influence of some parameters:
underflow nozzle diameter $d_{ss}$ As the underflow diameter decreases, the cut diameter increases and the underflow particle size (D50) also increases, while the overflow particle size remains almost identical. The physical interpretation is that as the underflow nozzle diameter increases, the liquid flow to the underflow also increases, thus increasing the probability of entraining fine particles to the underflow.

Effect of the pressure P at the hydrocyclone supply:

When the pressure increases at the supply, all other things being equal, the cut diameter increases and the particle size (D50) of the underflow increases.

However, the effect of pressure on the selection is less marked when the underflow nozzle diameter is severely choked.

Solid content at the feeding inlet ($MS_A$):

All other things being equal, when the MS increases at the cyclone supply, the cut diameter increases and the particle size (D50) of the underflow increases.

In the same way as for the pressure effect at the supply, the effect of $MS_A$ on the selection is more marked when the diameter of the underflow nozzle $d_{ss}$ is large.

Under Bayer industrial conditions, it might be possible to consider using hydrocyclones with $d_c$ between 24 mm and 250 mm, to extract insoluble residues: if $d_c$ becomes smaller, the flows treated by the hydrocyclone are too low and the number of hydrocyclones to be used in the Bayer line becomes economically prohibitive: if $d_c$ becomes larger, the cut diameter becomes completely inappropriate.

A.2. Thickener Hydrocyclone

A hydrocyclone with a diameter $d_c=75$ mm equipped with an overflow nozzle with diameter $d_{sr}=26$ mm was tested. The resulting parameters and operating points are specified in table 1.

TABLE 1

| $d_{ss}$ mm | P bar | $MS_A$ g/l | $Q_A$ m3/h | $Q_{ss}$ m3/h | $Q_{SR}$ m3/h | $MS_{ss}$ g/l | $MS_{sr}$ g/l |
|---|---|---|---|---|---|---|---|
| 8 | 1.8 | 144 | 6.34 | 0.34 | 6.00 | 1030 | 97 |
| 10 | 1.6 | 116 | 6.00 | 0.40 | 5.60 | 792 | 70 | where $Q_A$, $Q_{SS}$, $Q_{SR}$ are the supply flow, underflow and overflow respectively, $MS_{SS}$ and $MS_{SR}$ are solid contents at the overflow and underflow respectively.

The overflow from the hydrocyclone into which flocculent had been added was input into a pilot settler. The operating point of the settler under stable conditions is given in table 2:

TABLE 2

| $Q_A$ m3/h | $MS_A$ g/l | $Q_{SR}$ m3/h | $MS_{sr}$ g/l | $QS_{ss}$ m3/h | $MSS_{ss}$ g/l |
|---|---|---|---|---|---|
| 5.6 | 70 | 5 | 0 | 0.6 | 498 |

The following information can be drawn from these tests:

it would be perfectly possible to treat part of the slurry flow after digestion with a hydrocyclone, without needing to use a flocculent with a compacted mud in underflow from the cyclone with more than 750 g/l, which is considerable, the overflow from the hydrocyclone was treated successfully in the settler, in other words flocculation took place correctly with good compaction at the underflow from the clarifier and excellent clarification (in fact, the particle size curve of the underflow is very similar to the particle size curve of the supply).

the use of hydrocyclones in an existing installation enables debottlenecking of a settler, a washer or an entire settling/washing line.

The graph in FIG. 2 illustrates particle size distributions of particles in the supply (I), the underflow (II) and the overflow (III) respectively, of the hydrocyclone for which the underflow nozzle diameter $d_{ss}$ is 8 mm.

A.3. Clarifier Hydrocyclone

In order to obtain the clearest possible overflow, hydrocyclones are used for which the diameter of the underflow nozzle $d_{ss}$ is almost as large, or as large as the overflow nozzle diameter $d_{sr}$. This condition can be summarised by $d_{SS}>0.9*d_{SR}$. Operating parameters have been defined for a hydrocyclone with $d_c$ equal to 50 mm, capable of giving the clearest possible overflow with a solid content in the supply equal to $MS_A$ from 90 to 140 g/l.

The characteristics of the tested cyclone were as follows:
$D_c$=50 mm, $d_{sr}$=15 mm, $d_{ss}$=14 mm, with a supply pressure P equal to 1.8 bars.

The underflow from the cyclone can supply the ring of a pilot settler by gravity. We have measured the different overflows $Q_{SR}$ and underflows $Q_{SS}$ with and without the addition of a flocculent, and we have also recorded the solid contents in the two flows. The results are given in table 3.

TABLE 3

| Flocculent | P (bar) | $MS_A$ (g/l) | $Q_A$ (m3/h) | $Q_{ss}$ (m3/h) | $Q_{SR}$ (m3/h) | $MS_{ss}$ (g/l) | $MS_{sr}$ (g/l) |
|---|---|---|---|---|---|---|---|
| Without | 1.8 | 133 | 3.6 | 2.3 | 1.3 | 170 | 70 |
| With | 1.8 | 136 | 3.6 | 2.3 | 1.3 | 210 | 8 |

We supplied the settler with the underflow from the cyclone with and without the addition of flocculent.

Without the addition of flocculent, the mud from the cyclone underflow does not thicken or hardly thickens in the settler.

Clarification is obtained when flocculent is added (even with a remarkably low dose), so that mud at the underflow from the settler can be compacted. Thus, by supplying a slurry with a solid content equal to 90 to 140 g/l to the hydrocyclone, and adding a flocculent to the hydrocyclone supply, we obtain an overflow with a solid content equal to less than 10 g/l. The underflow from the cyclone may be clarified and thickened in the settler provided that a very small additional quantity of flocculent is added at the settler input.

Finally, the hydrocyclone overflow is a flocculated slurry (large flakes can be observed), which, after mixing with the settler overflow, has very good filterability.

B. Application to Industrial Installations

B.1. Typical Bayer Line According to Prior Art (FIG. 3)

The ground bauxite ore 10 is hot digested (A) using an aqueous solution of sodium hydroxide 4 with an appropriate concentration, thus causing solubilisation of alumina and obtaining a slurry 20 composed of undigested residue particles immersed in a sodium aluminate solution, called an "aluminate liquor". This slurry is then diluted (D) and is treated so as to separate undigested residues 40 from the aluminate liquor 1, by settling (E). Once "cleaned" by filtration (F) from the overflow 1 of the settler-thickener E, the aluminate liquor is cooled to a temperature at which it is in a highly unbalanced state of supersaturation (liquor 2) that causes crystallisation of alumina trihydrate 100 during the so-called "crystallisation" step (P). After crystallisation of the sodium aluminate liquor 3, depleted in alumina hydrate due to the precipitation, it is recycled after concentration by evaporation (B) towards digestion (A) of the ore 10. In general, a flocculent 75 is used in the aluminate liquor, for example at a point on the input side of the settler-thickener E.

Red mud, for which the particle size is less than 100 µm (in practice less than 106 µm or 315 µm depending on the bauxite considered), is separated by sedimentation. The slurry 21, after digestion and dilution, is passed into a settler-thickener E and the underflow 40 is extracted so that it is then washed by backwashing in a settlers-washers line (W1, W2, W3, ..., Wn−1, Wn) by water that gradually becomes richer in soda (60, 61, 69, 70), the clear liquor 70 from the first washer W1 being input into the Bayer circuit to do the dilution (D) after digestion. However, impregnation of the underflows (41, 42, 49, 50) from the different washers-clarifiers (W1, W2, W3, ..., Wn−1, Wn) becomes gradually depleted in soda and the underflow 50 from the last washer Wn, commonly called "red mud" is evacuated, for example, by dry-stacking.

Typically, the solid content:
in the slurry 20 before dilution is 120-160 g per litre of liquor;
in the diluted slurry 21 is 40-80 g per litre of liquor;
in the overflow 1 from the clarifier-thickener E is less than 1 g/l, typically 0.2 g/l; this content drops to a value close to zero in the pregnant liquor 2 output from the safety filtration (F);
the underflow 40 from the settler-thickener E is 300-500 g/litre of slurry; this content remains approximately constant in the washing line, such that the solid content of the red mud 50 at the output from the last washer Wn is approximately 400 g/litre.

B.2. First Embodiment: Hydrocyclone Used as a Thinner of the Pregnant Liquor (FIG. 4)

FIG. 4 illustrates a particular implementation of this first embodiment of the invention.

The circuit used is similar to the conventional Bayer process in FIG. 1 but is different from it due to the fact that an aliquot 21*a* of the diluted slurry representing the largest possible part, preferably all of the diluted slurry 21, is directed to at least one hydrocyclone H1 operating as a clarifier like one of those described above in Section A.3. The solid content at the hydrocyclone inlet may be as high as 140 g/l, it would be possible to consider making a lower dilution D' than in prior art for example using only an aliquot 70'*a* of the washer clear liquor, and possibly even completing it for example using another aliquot 70'b of the washer clear liquor on the overflow 81 from hydrocyclone H1, and/or by for example adding another aliquot 70'c of washer clear liquor on the underflow 82 from hydrocyclone H1.

As we have seen in A.3., the addition of flocculent is a means of efficiently clarifying the overflow 81 from the hydrocyclone H1, so that it may be sent to the safety filtration F and the crystallisation line P, either directly or after mixing with the overflow 1' from the settler-thickener. Therefore, flocculent additive 75 is added into the aliquot 21a of the diluted slurry on the input side of hydrocyclone H1. In the special context of this example, a second addition is made of a small quantity of flocculent 76 in the underflow 82 from the hydrocyclone H1.

Typically, the solid content:

in the slurry 20 before dilution, is equal to 120-160 g per litre of liquor;

in the diluted slurry 21a, is equal to 110 g per litre of liquor;

in the pregnant liquor 1", resulting from a mix of the overflow 81 from hydrocyclone H1 and the overflow 1' of the settler-thickener E is less than 5 g/l; the pregnant liquor has very good filterability, due to the well flocculated overflow 81 from the hydrocyclone. The solid content in the pregnant liquor output from the safety filtration (F) drops to a value close to 0;

from the underflow 40' of the settler-thickener E is 750 g/litre of impregnation liquid; this content remains approximately constant in the washing line, such that the number p of washers in the washing line may be reduced. The solid content in the red mud 50' at the output from the last washer Wp is equal to approximately 750 g/litre.

The advantage of the hydrocyclone+settler combination at the output from digestion lies in the fact that separation takes place very quickly (residence time equal to a few seconds): a large part of the aluminate liquor flow does not need to pass through the settler-thickener, which means that the slurry flow to be treated is significantly lower (of the order of 30% if the entire slurry passes through the hydrocyclones).

The following could be used for a diluted slurry flow 21a equal to 1000 m³/h, depending on the nature of the digested bauxites:

340 hydrocyclones with 50 mm diameter, as described in A.3 ($d_{SS}$=14 mm; $d_{SR}$=15 mm)

125 hydrocyclones with 75 mm diameter, with $d_{SS}$=21 mm; $d_{SR}$=22.5 mm 85 hydrocyclones with 100 mm diameter, with $d_{SS}$=28 mm; $d_{SR}$=30 mm 50 hydrocyclones with 150 mm diameter, with $d_{SS}$=38 mm; $d_{SR}$=40 mm 30 hydrocyclones with 200 mm diameter, with $d_{SS}$=42 mm; $d_{SR}$=44 mm.

B.3. Second Embodiment

B 3.1. Hydrocyclone Used as a Slurry Thickener after Digestion (FIG. 5a)

FIG. 5a shows the circuit used, which is similar to the conventional Bayer circuit in FIG. 1 but is different from it due to the fact that an aliquot 21c of the slurry, representing the largest possible part, and preferably the entire slurry, is sent to at least one hydrocyclone H21 operating as a thickener. This slurry aliquot can be sampled after dilution by the clear liquor from the first washer 70 and after adding flocculent 75. This aliquot is passed through at least one hydrocyclone H21.

The geometric parameters of the hydrocyclone H21 are defined to efficiently thicken the underflow 23 that is then sent directly to the underflow mud 40" of the settler-thickener E.

The overflow 22 is sent to the supply to the settler-thickener, thus diluting the other aliquot 21d (if any) of the slurry that is then directly poured into the settler-thickener E.

B 3.2. Hydrocyclone Used as a Red Mud Thickener (FIG. 5b)

FIG. 5b illustrates another particular implementation of the second embodiment of the invention.

The circuit used is similar to the conventional Bayer circuit in FIG. 1, but is different from it due to its washing line.

At least one hydrocyclone H22 is added into the circuit carrying the wash water from one washer to the previous washer, in backwash. Preferably, the hydrocyclone is added into a circuit close to the first washer W1, so that mud is thickened at the beginning of the washing line. In the particular example given here, an aliquot 68a of wash water from washer W3 to washer W2 passes through at least one hydrocyclone H22. The dimensions and operating parameters of the hydrocyclone H22 are chosen as indicated in A2. This aliquot is mixed with the underflow 41 from the first washer W1 and the mix 90 is added into at least one hydrocyclone H22. The underflow is directed to the washer W3 with the underflow 42 from the second washer W2. The overflow 91 is added into the washer W2.

Typically, the solid content:

in the slurry 20 before dilution, is 120-160 g per litre of liquor;

in the diluted slurry 21, is 60-80 g per litre of liquor;

in the overflow 1 from the settler-thickener E, is lower than 1 g/l, typically 0.2 g/l: this content drops to a value close to zero for the pregnant liquor 2 output from the safety filtration (F);

the overflow 40 from the settler-thickener E is 450 g/litre of impregnation liquid: the underflow 41 from the first washer W1 has approximately the same solid content;

the wash water 68a is mixed with the underflow 41, the resulting slurry 90 is introduced into H22 with a solid content equal to of the order of 140 g/l. The overflow 91 from the hydrocyclone has a solid content of 100 g/l, the underflow 92 has a solid content of 1000 g/l. Therefore, it can be seen that, starting from the washer W3, the washing line washes residues with a much higher solid content, typically between 700 g/l and 1000 g/l. The red mud 50" is evacuated with a solid content equal to 700-1000 g/l. This improves the washing efficiency by increasing the concentration of mud, and thus the number of q of washers in the washing line can be reduced.

For a flow of an insoluble residues slurry 40 equal to 1000 m3/h, typically with a solid content of 450 g/l, the following can be used depending on the nature of the digested bauxites:

125 hydrocyclones with 75 mm diameter, with $d_{SS}$=8 mm; $d_{SR}$=26 mm 85 hydrocyclones with 100 mm diameter, with $d_{SS}$=12 mm; $d_{SR}$=39 mm 50 hydrocyclones with 150 mm diameter, with $d_{SS}$=16 mm; $d_{SR}$=52 mm 30 hydrocyclones with 200 mm diameter, with $d_{SS}$=26 mm; $d_{SR}$=56 mm.

B.4. Third Embodiment Hydrocyclones Used in Combination with the Causticisation Settler (FIGS. 6 and 7)

In general, wash water output from the overflow form the second or third washer in the insoluble residues washing line, is causticised. Thus, part of the carbonated soda entrained with the red mud, is transformed. FIG. 6 includes the diagram in FIG. 3, with a typical causticisation circuit added to it; before being poured into the first washer W1, the wash water 69 enriched with soda and sodium carbonate by washings in the downstream settlers-washers, is sent to a tank C (causticisation reactor) in which a given quantity of lime 200 is poured. The mix is maintained by stirring in the causticisation reactor C with a reaction temperature of close to 95° C. After a sufficient residence time to transform the lime and sodium carbonate into sodium hydroxide and calcium carbonate, the overflow 210 is carried to a settler, called the causticisation settler DC at the bottom of which the precipitated calcium carbonate accumulates. The overflow 220 is sent to the first washer W1. The underflow 230 is mixed with the underflow from one of the last settler-washer blocks ($W_{n-2}$ in the example illustrated in FIG. 6).

According to this third embodiment of the invention (illustrated in FIG. 7), the underflow 230' from the causticisation settler tank is pumped to at least one hydrocyclone H3. The overflow 240 from the hydrocyclone(s) H3 is sent to the first washer W1. The thickened mud from the underflow 250 from the hydrocyclone(s) H3 is partially mixed (250a) with the mud output from one of the last settler-washer tanks ($W_{n-2}$ in the example illustrated in FIG. 6) and are partly recycled (250b) to the causticisation reactor C.

The mud 230' output from the causticisation settler DC has typically a solid content between 200 and 300 g/l. The purpose and the advantage of combining the hydrocyclone(s) H3 and the causticisation settler DC, with the hydrocyclone(s) being supplied by the underflow 230' from the causticisation settler, are to:

reduce recycling of clear liquor in the washer to which the mud are pumped, since mud has been thickened more in the hydrocyclone;

enable recycling of part of the mud thus thickened at the beginning of causticisation (the mud then acts as a seed in the causticisation reactor), so that the causticisation efficiency can thus be improved.

With a clear liquor from the second washer 69' to be causticised circulating with a flow of 500 m3/h, a flow of 40 m3/h of mud 230' with a concentration of solids of 250 g/l, can be obtained after the causticisation reaction and at the output from the causticisation clarifier, this mud flow then being pumped to hydrocyclones combined at the causticisation clarifier, the number of hydrocyclones varying depending on their size:

5 hydrocyclones with diameter 75 mm, with $d_{SS}$=8 mm, $d_{SR}$=26 mm;
4 hydrocyclones with diameter 100 mm, with $d_{SS}$=8 mm, $d_{SR}$=26 mm;
2 hydrocyclones with diameter 150 mm, with $d_{SS}$=14 mm, $d_{SR}$=45 mm.

The overflow 220' from the causticisation settler DC and the overflow 240 from the hydrocyclone(s) H3 are sent to the first washer W1.

The invention claimed is:

1. In a process for production of alumina trihydrate by alkaline digestion of bauxite using the Bayer process, comprising the steps of grinding and then bringing the ground bauxite into contact with a sodium aluminate liquor to digest the ground bauxite by forming a slurry, diluting the slurry and treating the diluted slurry in a liquid/solid separation device to separate insoluble residues from the sodium aluminate liquor, obtaining thereby a pregnant aluminate liquor from which alumina trihydrate is precipitated by crystallization, separating the precipitated alumina trihydrate from the pregnant aluminate liquor and then recycling the separated liquor as a green liquor, the improvement comprising passing at least a portion of the diluted slurry, upstream or downstream of the liquid/solid separation device, and before said precipitation by crystallization, through a hydrocyclone having an overflow and an underflow to accelerate and improve separation of the sodium aluminate liquor from insoluble residues having a particle size smaller than 106 μm.

2. Process according to claim 1, wherein the hydrocyclone has an underflow nozzle and an overflow nozzle, and the underflow nozzle has a diameter greater than 90% of the diameter of the overflow nozzle.

3. Process according to claim 2, wherein the liquid/solid separation device is a settler-thickener and wherein an aliquot of the slurry diluted after digestion passes through at least one hydrocyclone upstream from the settler-thickener.

4. Process according to claim 3, wherein a flocculent is added into the aliquot of diluted slurry and wherein the pregnant aluminate liquor exits from the overflow of the hydrocyclone and is sent to a crystallization line for said crystallization without passing through the settler-thickener, and the insoluble residues exit from the underflow of the hydrocyclone and are sent to the settler-thickener.

5. Process according to claim 2, wherein a portion of said diluting takes place on the separated sodium aluminate liquor downstream of the settler-thickener.

6. Process according to claim 1, wherein at least one aliquot of slurry is drawn off after digestion, and is passed through at least one hydrocyclone with the underflow being sent directly towards the insoluble residues of an underflow from the liquid/solid separation device and the overflow being directed towards an input side of the liquid/solid separation device, thus diluting an aliquot of the slurry that is not passed through the at least one hydrocyclone, and is directly poured in the liquid/solid separation device.

7. Process according to claim 6, wherein the at least one aliquot of slurry is drawn off after digestion, after reduction of caustic concentration therein, and after adding flocculent thereto.

8. Process according to claim 1, wherein the insoluble residues are extracted when reaching a solid content of more than 400 g/l, and are then backwashed in a line of settlers-washers, and wherein at least one hydrocyclone is added into a circuit that carries backwash water from a first settler-washer to a second settler-washer on an upstream side of the first settler-washer, relative to flow of insoluble residues.

9. Process according to claim 8, wherein at least one aliquot of wash water from a settler-washer on a downstream side of a settler-washer is mixed with insoluble residues from an underflow from a settler on an upstream side of the settler-washer, and wherein a resulting mixture is introduced into at least one hydrocyclone, having an overflow which feeds the settler-washer and an underflow producing thickened mud which is mixed with the insoluble residue from the underflow from the settler-washer, resulting in a mixture which is sent to a downstream settler-washer.

10. Process according to claim 1, wherein at least one aliquot of slurry is drawn off after said digestion and dilution, and is passed through at least one hydrocyclone having an underflow nozzle and an overflow nozzle, the underflow nozzle having a diameter greater than 90% of the diameter of the overflow nozzle, with another aliquot optionally passing through at least one hydrocyclone, the underflow being sent directly towards insoluble residues of an underflow from the liquid/solid separation device, and an overflow being directed towards an input side of the liquid/solid separation device, thus diluting another aliquot of the slurry that is not directed to the hydrocyclone, and is directly poured in the liquid-solid separation device, and wherein the insoluble residues are extracted and then backwashed in a line of settlers-washers, in which at least one hydrocyclone is added, wherein the insoluble residues are extracted at a solid content of more than 400 g/1, and is then backwashed in a line of settlers-washers, and wherein at least one hydrocyclone is added into a circuit that carries backwash water from a first settler-washer to a second settler-washer on an upstream side of the first settler-washer, relative to flow of insoluble residues.

11. Process according to claim 1, wherein the insoluble residues are washed in washing line with water and the water used to wash the separated insoluble residues is causticised by passing the water through a reactor tank into which lime is added, the mixture of lime and water being maintained for a time sufficient for calcium carbonate to precipitate, and then the water is directed to a causticisation settler to separate the water from the precipitated calcium carbonate, the causticisation settler being associated with at least one hydrocyclone, and supplies the at least one hydrocyclone with underflow precipitate from the causticisation settler.

12. Process according to claim 11, wherein overflow from the at least one hydrocyclone is directed to the washing line on an upstream side of a settler-washer from which the water has been removed for causticisation, and wherein insoluble residues underflow from the at least one hydrocyclone is partially recycled to the causticisation reactor and partially mixed with insoluble residues output from a settler-washer in the washing line.

* * * * *